Sept. 15, 1942.  A. R. PERKINS  2,296,181
POWER PLANT FRAME FOR TRUCKS
Filed July 23, 1941  3 Sheets-Sheet 3
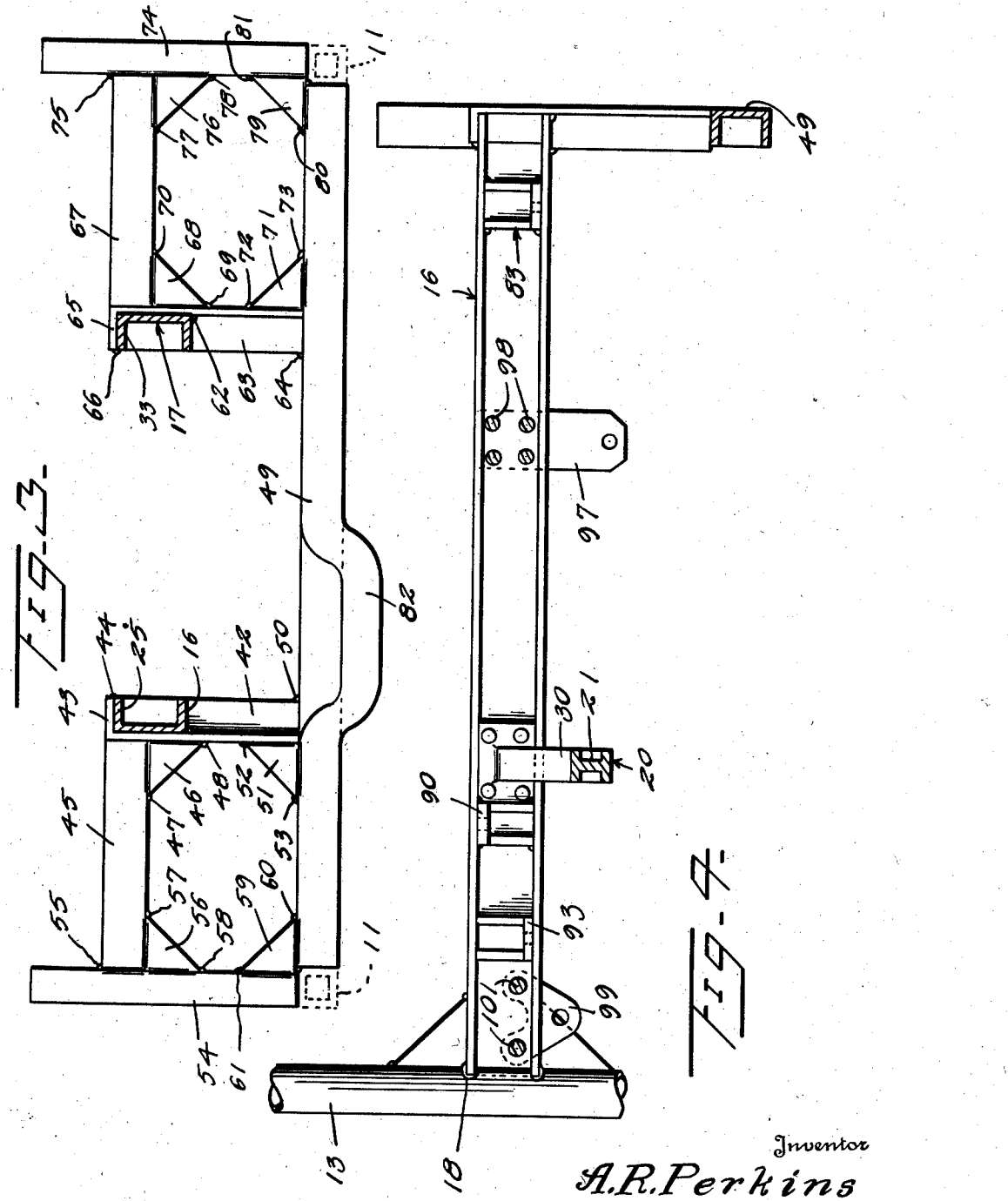
Inventor
A.R.Perkins
By Kimmel & Crowell
Attorneys Patented Sept. 15, 1942

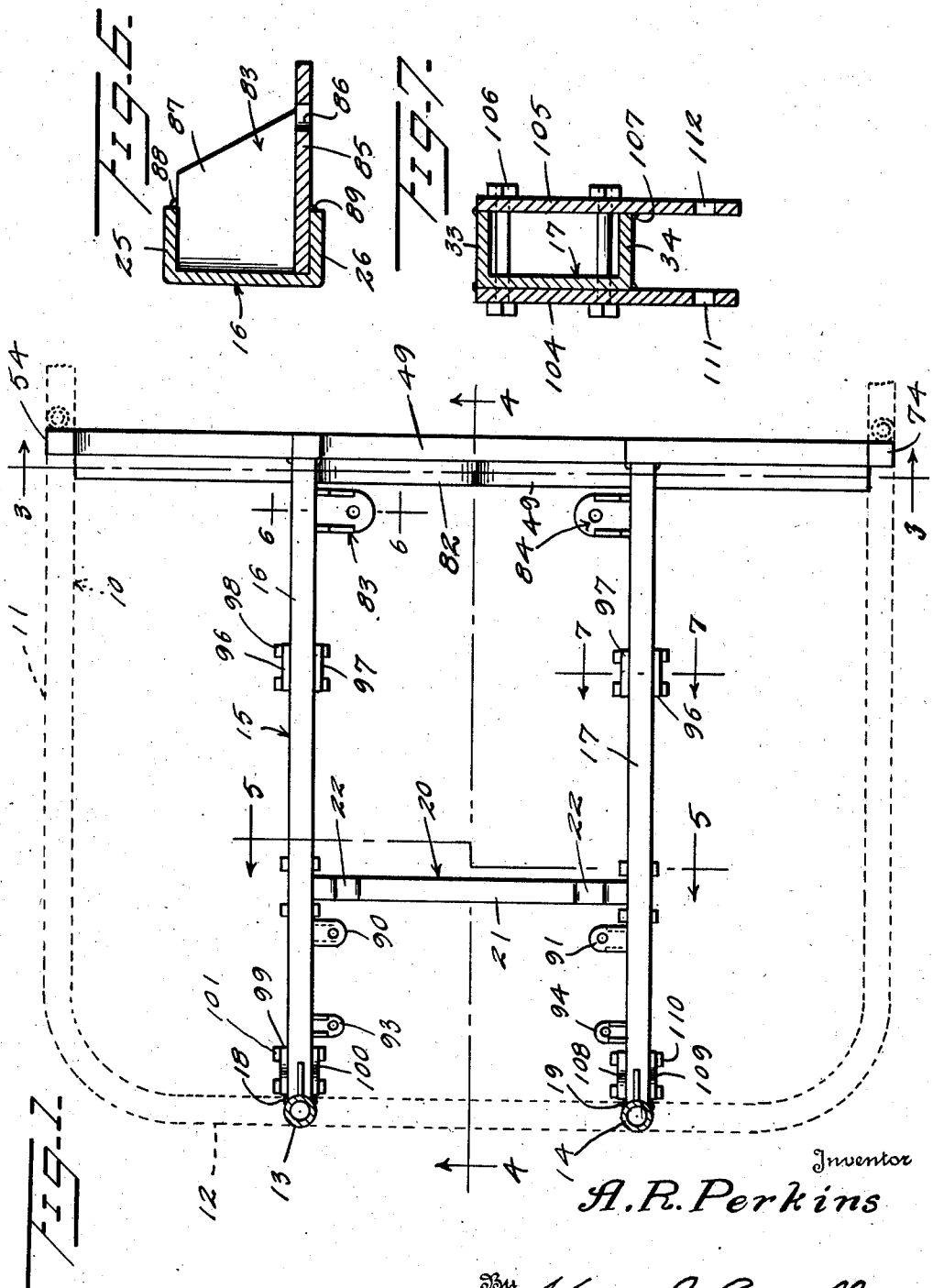

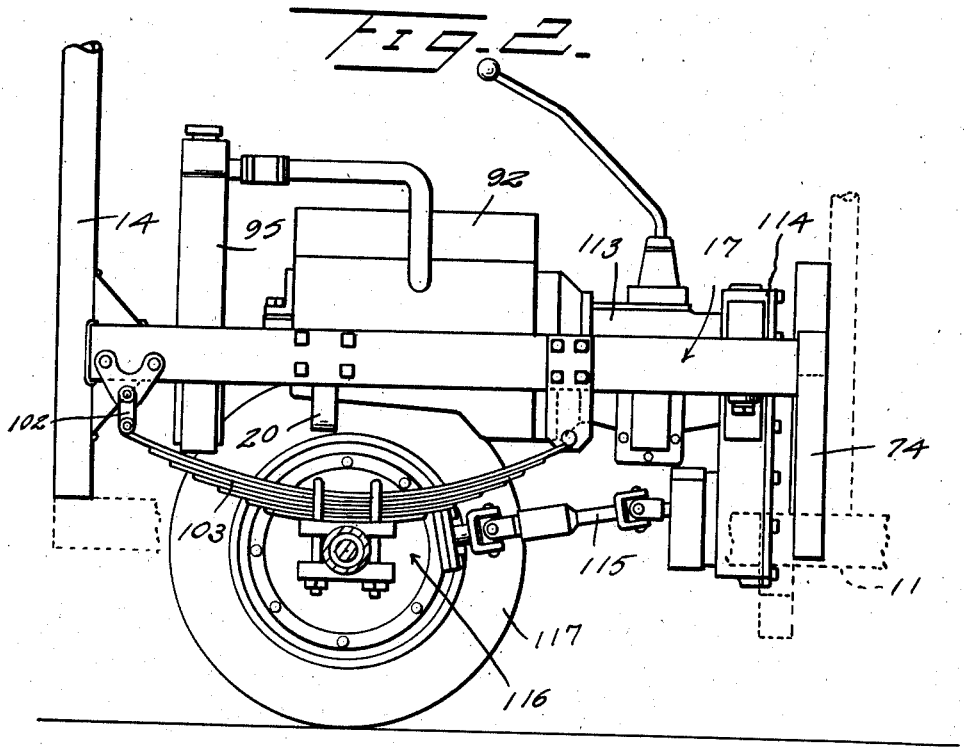
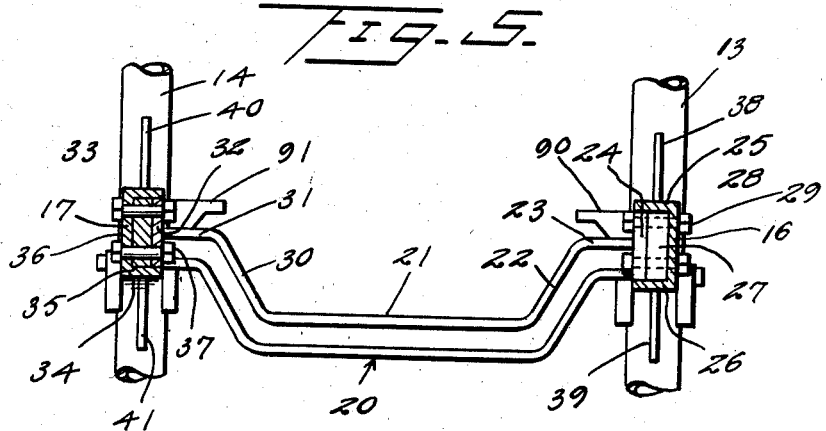

2,296,181

UNITED STATES PATENT OFFICE 2,296,181

POWER PLANT FRAME FOR TRUCKS

Arthur R. Perkins, Oneonta, N. Y.

Application July 23, 1941, Serial No. 403,734

8 Claims. (Cl. 180—64)

This invention relates to a power plant assembly frame for mounting a front drive power assembly as shown in my copending application Serial No. 403,733 filed of even date herewith in the truck or coach body frame structure shown in my copending application Serial No. 403,731 also filed of even date herewith.

An object of this invention is to provide a frame structure for supporting a front drive assembly which is so constructed that it may be readily secured within a truck body frame as a separate unit.

Another object of this invention is to provide a power plant frame structure of this kind which is so constructed that the power plant may be initially mounted on the frame exteriorly of the truck or coach body, and the frame structure later fixed firmly within the truck or coach body, thereby facilitating the positioning of the power plant assembly as a unit in the truck or coach body.

A further object of this invention is to provide in combination a truck or coach body frame and a power plant assembly frame so that the two frames may be initially constructed as separate elements and subsequently connected together to form a substantially integral frame structure.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a detail top plan partly in section of a power plant frame for a truck or coach body constructed according to an embodiment of this invention, Figure 2 is a detail side elevation of the frame structure with the front wheel drive unit shown more specifically in my copending application Serial No. 403,733 filed of even date herewith mounted therein, Figure 3 is a sectional view taken on the line 3—3 of Figure 1, Figure 4 is a sectional view taken on the line 4—4 of Figure 1, Figure 5 is a sectional view taken on the line 5—5 of Figure 1, Figure 6 is a sectional view taken on the line 6—6 of Figure 1, and Figure 7 is a sectional view taken on the line 7—7 of Figure 1.

Referring to the drawings the numeral 10 designates generally a vehicle body frame structure constructed as set forth more specifically in my copending application Serial No. 403,731 for a truck or coach body frame filed of even date herewith. The frame structure 10 includes side frame members 11 and a front frame structure 12. The front frame structure 12 has secured thereto a pair of vertically disposed tubular frame or supporting members 13 and 14 and a front drive power frame supporting structure generally designated as 15 is adapted to be secured to the vertically disposed frame members or posts 13 and 14 and is also adapted to be secured between the side frame members 11 adjacent the lower portions thereof.

The frame structure 15 includes a pair of parallel spaced apart channel members 16 and 17 which are disposed with the channel portions thereof confronting each other. The forward end portions of the channel members 16 and 17 are adapted to be welded as at 18 and 19 to the posts or vertical supporting members 13 and 14 respectively. The channel members 16 and 17 have disposed therebetween a connecting or bracing member 20, which is constructed in the form of an eye beam and which has a downwardly offset central or intermediate portion 21. The intermediate portion 21 has formed integral with one end thereof an upwardly and outwardly extending extension 22, which terminates in the horizontally disposed upwardly offset portion 23. A plate 24 is fixed to the outer end portion of the horizontal extension 23 and extends a slight distance upwardly therefrom. The plate 24 is of such a height that it will snugly engage between the inwardly projecting parallel sides or legs 25 and 26 of the channel member 16. A spacer block 27 may, if desired, be interposed between the plate 24 and the bight or outer side 28 of the channel member 16.

Fastening devices 29 in the form of bolts or the like are adapted to tightly hold the plate 24 relative to the channel member 16. The opposite end portion of the intermediate spacing and bracing member 20 has formed integrally therewith an upwardly and outwardly extending part 30, which terminates in a horizontally and outwardly extending upper part 31 which is disposed co-planar with the upper extension 23. A right angularly disposed plate 32 is welded or otherwise fixedly secured to the outer end portion of the horizontal extension 31 and is adapted to snugly engage between the upper and lower sides 33 and 34 of the channel member 17. A spacer block 35 is interposed between the plate 32 and the outer side or bight 36 of the channel member 17 and fastening devices 37 in the form of bolts or the like are adapted to tightly hold the plate 32 relative to the channel member 17.

In order to provide a means whereby the forward end portions of the channel members 16 and 17 may be braced relative to the posts or supporting members 13 and 14, I have provided a pair of upper and lower triangular gussets or bracing members 38 and 39, which are welded to the upper and lower side members 25 and 26 and to the rear side of the post or supporting member 13. The opposite channel member 17 has welded to the upper and lower sides 33 and 34 thereof a pair of triangularly shaped gussets or bracing members 40 and 41 respectively, which are also welded to the rear side of the post or supporting member 14. The rear end of the channel member 16 has welded or otherwise fixedly secured thereto a vertically disposed angle member 42, which is formed at its upper end with an inwardly projecting plate 43, which may be welded as at 44 to the upper side 25 of the channel member 16.

An outwardly extending angle member 45 is welded or otherwise fixedly secured to the vertical angle member 42 and a triangularly shaped bracing member 46 is welded as at 47 and 48 to the horizontal member 45 and the vertical member 42 respectively. A horizontally disposed and transversely extending channel or tubular member 49 is welded as at 50 to the lower end of the vertical member 42 and is adapted to be welded or otherwise fixedly secured at the opposite ends thereof to the lower frame members 11 forming a part of the vehicle body or frame structure 10. A triangularly shaped bracing member 51 is welded as at 52 and 53 to the vertical member 42 and the lower horizontal member 49. An outer vertically disposed frame member 54 is welded or otherwise fixedly secured as at 55 to the outer end of the upper side of the horizontal member 45 and a triangularly shaped bracing member 56 is welded or otherwise fixedly secured as at 57 and 58 to the horizontal member 45 and the vertical member 54 respectively.

A lower triangularly shaped bracing member 59 is welded or otherwise fixedly secured as at 60 and 61 to the lower horizontal frame member 49 and the outer vertical frame member 54 respectively. The other channel member 17 has welded as at 62 a rear vertically disposed angle member 63. The rear angle member 63 is adapted to be welded or otherwise fixedly secured to the lower horizontal frame member 49 as at 64. The upper end of the angle member 63 is formed with an inwardly bent extension 65, which may be welded as at 66 to the upper side 33 of the channel member 17. A rear outwardly extending angle member 67 is adapted to be welded or otherwise fixedly secured to the vertical angle member 63 and preferably a triangularly shaped bracing member 68 is welded as at 69 and 70 to the vertical angle member 63 and the horizontal angle member 67 respectively.

A lower triangularly shaped bracing member 71 is welded as at 72 and 73 to the vertical angle member 63 and the horizontal frame member 49. An outer vertically disposed frame member 74 is welded as at 75 to the outer end of the upper horizontal member 67 and a triangularly shaped bracing member 76 is welded as at 77 and 78 to the upper horizontal frame member 67 and the vertical frame member 74 respectively. The lower end of the vertical frame member 74 is adapted to be welded or otherwise fixedly secured to the adjacent channel or tubular body frame member 11. A triangularly shaped bracing member 79 is adapted to be welded, as at 80, to the lower frame member 49 and also to be welded as at 81 to the vertical frame member 74.

The horizontal lower frame member 49 which connects the lower ends of the vertical frame members 42 and 63 together is formed intermediate these frame members with a downwardly offset intermediate portion 82 within which the lower rear portion of the transfer case or housing embodied in my copending application Serial No. 403,732, filed of even date herewith, is adapted to loosely engage. The channel members 16 and 17 have welded to the inner side portions thereof a pair of rear bracket members 83 and 84 respectively, the details of which are shown more clearly in Figure 6. These two bracket members 83 and 84 are of identical construction and are adapted to support the transfer case or housing and each bracket member includes a lower inwardly projecting plate 85 formed with an opening 86 for receiving a fastening device for attaching a portion of the transfer case thereto.

A pair of vertically disposed bracing members 87 are secured to the opposite ends of the base plate 85 and are adapted to extend outwardly and snugly engage between the upper and lower side members 25 and 26 of the channel member 16. The bracing members 87 and the base plate 85 are adapted to be welded as at 88 and 89 to the channel member 16.

The frame structure 15 is also adapted to have fixedly secured thereto as by welding or the like a pair of inwardly projecting motor supporting brackets 90 and 91, which are welded or otherwise fixedly secured to the channel members 16 and 17 and project inwardly therefrom. These brackets 90 and 91 are adapted to support the forward end portion of a motor or engine generally designated as 92, which is shown in Figure 2. The bracket members 90 and 91 are constructed similar to the bracket members 83 and 84 but are disposed in an inverted position as shown in Figure 4.

A second or forward pair of inwardly projecting brackets 93 and 94 are secured to the channel members 16 and 17 forwardly from the brackets 90 and 91 and are adapted to support a radiator 95, which is shown in Figure 2. The channel member 16 has fixed thereto a pair of spring supporting plates 96 and 97, which may be secured to the opposite sides of the channel member 16 by fastening devices 98 and also by welding if desired. A forward pair of spring shackle supporting members 99 and 100 are secured by fastening devices 101 to the forward end portion of the channel member 16 and spring shackles 102 are adapted to be connected with the supporting members 99 and 100 and also with the forward end of a spring structure 103, shown in Figure 2. The channel member 17 has fixedly secured thereto at a point spaced forwardly from the rear end thereof a pair of vertically disposed spring supporting plates 104 and 105, which may be secured to the channel member 17 by fastening devices 106 and also by welding 107 as shown in Figure 7.

A forward pair of spring shackle supporting members 108 and 109 are secured as by fastening devices 110 to the forward end portion of the channel member 17. The supporting members 108 and 109 are adapted to have secured thereto shackle members 102 and a spring structure 103 is associated with the shackle member 102 and is adapted to be secured at its rear end portion between the plates 104 and 105. The plates 104 and 105 are provided with a pair of aligned openings 111 and 112 respectively through which the shackle bolt at the rear end of the spring structure 103 is adapted to engage.

The engine structure or motor 92 has connected therewith a transmission 113 and a transfer mechanism 114 shown more specifically in my copending application Serial No. 403,733 for a front drive power unit filed of even date herewith. A forwardly projecting drive shaft 115 is operated from the transfer mechanism 114 and connected at its forward end with a front axle structure generally designated as 116 for driving the front wheels 117.

In the use of the power plant frame or interior chassis hereinbefore described the frame structure 15 is adapted to be initially constructed as a unit and the front drive mechanism shown in Figure 2 may then be secured to the frame structure 15. This frame structure 15 with the drive unit mounted therein is then adapted to be welded or otherwise fixedly mounted within the frame structure 10. In this manner the frame structure 10 forming the frame of the vehicle or truck body may be constructed as a separate unit and subsequently the complete power unit including the front drive mechanism and the insertible interior chassis may be welded within the frame structure 10.

The frame structure 15 for the power unit is substantially shorter in length than the length of the vehicle body being only slightly longer in length than the length of the power unit, as shown in Figure 2. In this manner the front end portion of the vehicle body may be formed into a cab or compartment and the remaining or major portion of the vehicle body may be used for receiving the articles which are to be transported by the complete truck structure.

What I claim is:

1. A power plant frame for truck or vehicle bodies comprising a pair of parallel horizontally disposed channel members, a connecting member fixed at the opposite ends thereof to said channel members inwardly from an end thereof, a right angularly disposed elongated member positioned adjacent the rear ends of said channel members and offset downwardly therefrom, pairs of vertically disposed members fixed at their lower ends to said elongated member, means fixedly securing the rear ends of said channel members to one member of each pair of said vertical members, and a connecting member fixed between each pair of said vertical members in parallel and upwardly offset relation with respect to said elongated member.

2. A power plant frame for truck or vehicle bodies comprising a pair of parallel horizontally disposed channel members, a connecting member fixed at its opposite ends to said channel members inwardly from an end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, and a connecting member fixed between each pair of said vertical members in parallel and upwardly offset relation with respect to said elongated member.

3. A power plant frame for truck or vehicle bodies comprising a pair of parallel horizontally disposed channel members, a connecting member being substantially I-shaped in cross section with a downwardly offset intermediate portion fixed at its opposite ends to said channel members inwardly from the forward end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, and a connecting member fixed between each pair of said vertical members in parallel and upwardly offset relation with respect to said elongated member.

4. A power plant frame for truck or vehicle bodies comprising a pair of parallel horizontally disposed channel members, a connecting member fixed at its opposite ends to said channel members inwardly from an end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, a connecting member fixed between each pair of said vertical members in parallel and upwardly offset relation with respect to said elongated member, and a pair of inwardly directed opposed motor supports secured to said channel members forwardly of said first-named connecting member and adjacent thereto.

5. A power plant frame for truck or vehicle bodies comprising a pair of parallel horizontally disposed channel members, a connecting member fixed at its opposite ends to said channel members inwardly from an end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, a connecting member fixed between each pair of said vertical members in parallel and upwardly offset relation with respect to said elongated member, and pairs of spring supports secured to said channel members one of said pairs being adjacent the forward end of said channels and the second of said pairs being positioned inwardly from the rear end of said channel members.

6. A power plant frame for truck or vehicle bodies comprising a pair of parallel horizontally disposed channel members, a connecting member fixed at its opposite ends to said channel members inwardly from an end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, a connecting member fixed between each pair of said vertical members in parallel and upwardly offset relation with respect to said elongated member, and a pair of inwardly projecting, opposed transfer housing supporting brackets secured to said channel members adjacent the rear ends of said channel members.

7. A power plant frame for truck or vehicle bodies comprising a pair of parallel horizontally disposed channel members, a connecting member fixed at its opposite ends to said channel members inwardly from an end thereof, a right-angularly disposed elongated connecting member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, a connecting member fixed between each pair of said vertical members in parallel and upwardly offset relation with respect to said elongated member, and brace members secured to said pairs of upright members, said horizontal elongated member and said second-named connecting member.

8. A power plant frame for truck or vehicle bodies comprising a pair of parallel horizontally disposed channel members, a connecting member fixed at its opposite ends to said channel members inwardly from an end thereof, a right-angularly disposed elongated member positioned adjacent the rear ends of said channel members and offset downwardly therefrom, pairs of vertically disposed members fixed at their lower ends to said elongated member and having one member of each pair of said vertical members fixed at their upper ends to the rear ends of said channel members, a connecting member fixed between each pair of said vertical members in parallel and upwardly offset relation with respect to said elongated member, and a pair of inwardly projecting opposed radiator support brackets secured to said channel members inwardly from the forward ends thereof.

ARTHUR R. PERKINS.